(12) United States Patent
Ohta et al.

(10) Patent No.: US 12,017,218 B2
(45) Date of Patent: Jun. 25, 2024

(54) HYBRID MICROFLUIDICS DEVICES

(71) Applicant: INTERNATIONAL BUSINESS MACHINES CORPORATION, Armonk, NY (US)

(72) Inventors: Ricardo L. Ohta, Sao Paulo (BR); Ademir F. Silva, Sao Paulo (BR); Mathias B. Steiner, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 15/433,177

(22) Filed: Feb. 15, 2017

(65) Prior Publication Data

US 2018/0229234 A1 Aug. 16, 2018

(51) Int. Cl.
*B01L 3/00* (2006.01)
*G01N 21/77* (2006.01)
*G01N 21/78* (2006.01)

(52) U.S. Cl.
CPC ..... *B01L 3/50273* (2013.01); *B01L 3/502707* (2013.01); *G01N 21/78* (2013.01); *B01L 2200/0605* (2013.01); *B01L 2200/12* (2013.01); *B01L 2200/141* (2013.01); *B01L 2300/041* (2013.01); *B01L 2300/0825* (2013.01); *B01L 2300/0864* (2013.01); *B01L 2300/0887* (2013.01); *B01L 2300/126* (2013.01); *B01L 2400/0406* (2013.01); *G01N 2021/7759* (2013.01)

(58) Field of Classification Search
CPC ......... B01L 3/00; B01L 3/5027; G01N 15/14; G01N 33/483; G01N 21/86; G01N 15/08; B01D 65/10

USPC ......... 422/73, 420, 422, 425, 427, 501–504, 422/513, 534, 608, 616; 210/645, 780; 436/10; 356/246
See application file for complete search history.

(56) References Cited

U.S. PATENT DOCUMENTS 3,359,055 A * 12/1967 Krause ................. G02B 21/242
33/567.1
4,453,807 A * 6/1984 Faulkner ................ G02B 21/34
356/244
5,135,716 A * 8/1992 Thakore ................. B01D 61/18
422/412

(Continued)

FOREIGN PATENT DOCUMENTS

WO 2013/181656 A1 12/2013

OTHER PUBLICATIONS

Jokerst, J.C. et al., "Development of a Paper-Based Analytical Device for Colorimetric Detection of Select Foodborne Pathogens" Analytical Chemistry (Feb. 2012) pp. 2900-2907, vol. 84.

(Continued)

*Primary Examiner* — Dean Kwak
(74) *Attorney, Agent, or Firm* — Tutunjian & Bitetto, P.C.; James Olsen

(57) ABSTRACT

A hybrid microfluidics device includes a substrate having a base region with a width and a length. A paper has testing regions disposed along the width of the base region. A cover has an angled relationship with the base region to form a wedge profile to provide a length-wise droplet pump effect to separately maintain channel-less regions for the testing regions.

5 Claims, 6 Drawing Sheets

(56) References Cited

U.S. PATENT DOCUMENTS

| | | | | |
|---|---|---|---|---|
| 7,390,675 | B2* | 6/2008 | Feistel | G01N 30/90 |
| | | | | 435/287.9 |
| 9,377,457 | B1* | 6/2016 | Wang | G01N 21/8483 |
| 2005/0019222 | A1* | 1/2005 | Medland | B01L 3/5023 |
| | | | | 422/400 |
| 2009/0298191 | A1 | 12/2009 | Whitesides et al. | |
| 2011/0114190 | A1 | 5/2011 | Wen et al. | |
| 2012/0044299 | A1 | 2/2012 | Winger | |
| 2012/0149093 | A1* | 6/2012 | Gould | B01L 3/5023 |
| | | | | 435/286.2 |
| 2013/0052331 | A1* | 2/2013 | Kram | G01N 1/2813 |
| | | | | 427/2.11 |
| 2015/0111216 | A1* | 4/2015 | Delahunt | B01L 3/5023 |
| | | | | 435/6.15 |
| 2015/0132742 | A1 | 5/2015 | Thuo et al. | |
| 2015/0034619 | A1 | 12/2015 | Li et al. | |
| 2016/0008809 | A1* | 1/2016 | Li | C12Q 1/6865 |
| | | | | 506/9 |
| 2018/0136097 | A1* | 5/2018 | Barnett | G01N 35/00029 |

OTHER PUBLICATIONS

Bruzewicz, D.A. et al., "Low-Cost Printing of PDMS Barriers to Define Microchannels in Paper" Anal Chem. (May 2008) pp. 3387-3392, vol. 80, No. 9.

Martinez, A.W. et al., "Simple Telemedicine for Developing Regions: Camera Phones and Paper-Based Microfluidic Devices for Real-Time, Off-Site Diagnosis" Anal. Chem. (May 2008) pp. 3699-3707, vol. 80, No. 10.

Karlos, W. et al., "Toner and paper-based fabrication techniques for microfluidic applications" Electrophoresis (Apr. 2010) pp. 2487-2498, vol. 31.

Carrilho, E. et al., "Understanding Wax Printing: A Simple Micropatterning Process for Paper-Based Microfluidics" Anal. Chem. (Aug. 2009) pp. 7091-7095, vol. 81, No. 16.

Yetisen, A.K. et al., "Paper-based microfluidic point-of-care diagnostic devices" Lab Chip (Mar. 2013) pp. 2210-2251, vol. 13.

Han, Y.L. et al., "Benchtop fabrication of three-dimensional reconfigurable microfluidic devices from paper-polymer composite" Lab Chip (Sep. 2013) pp. 4745-4749, vol. 13.

* cited by examiner

HYBRID MICROFLUIDICS DEVICES

BACKGROUND

Technical Field

The present invention generally relates to microfluidic devices, and more particularly to microfluidic devices with hybrid structures and methods for fabrication.

Description of the Related Art

Paper-based microfluidics devices are analytical tools, capable of analyzing complex chemical samples. This kind of microfluidics device uses wick capabilities of paper for fluidic manipulations like transportation, sorting and mixing. The results are based on colorimetric analysis. These devices have limitations that are inherent to microfluidics technology. For example, fluid mixing is difficult to obtain, due to limited liquid capacity in paper wicking. Excess pipetted liquid can also be an issue, since excess liquid can generate overflow and cross-contamination. A typical cray-based hydrophobic barrier generally cannot withstand alcohols and other solvents, which limit this technology to water-based analysis only. Current non-paper-based microfluidics solutions also have limited mixing capabilities. These devices need closed channels and external pumps and tubing to drive fluids and droplets inside microchannels.

SUMMARY

In accordance with an embodiment of the present invention, a hybrid microfluidics device includes a substrate having a base region with a width and a length. A paper has testing regions disposed along the width of the base region. A cover has an angled relationship with the base region to form a wedge profile to provide a length-wise droplet pump effect to separately maintain channel-less regions for the testing regions. The channel-less regions avoid cross-contamination between the testing regions.

Another hybrid microfluidics device includes a substrate having a base region with a width and a length. A paper has a plurality of testing regions disposed along the width of the base region. A cover covers the paper and the base region of the substrate. One or more cover supports are disposed between the substrate and the cover to form a wedge profile along the length of the substrate.

A method for fabricating a hybrid microfluidics device includes forming a substrate having a base region with a width and a length; placing a paper having a plurality of testing regions disposed along the width of the base region on the base region; and placing a cover contacting the base region on a first end portion of the base region of the substrate and contacting the paper on a second end portion of the base region of the substrate to form a wedge profile where the cover is angled relative to the base region along the length.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
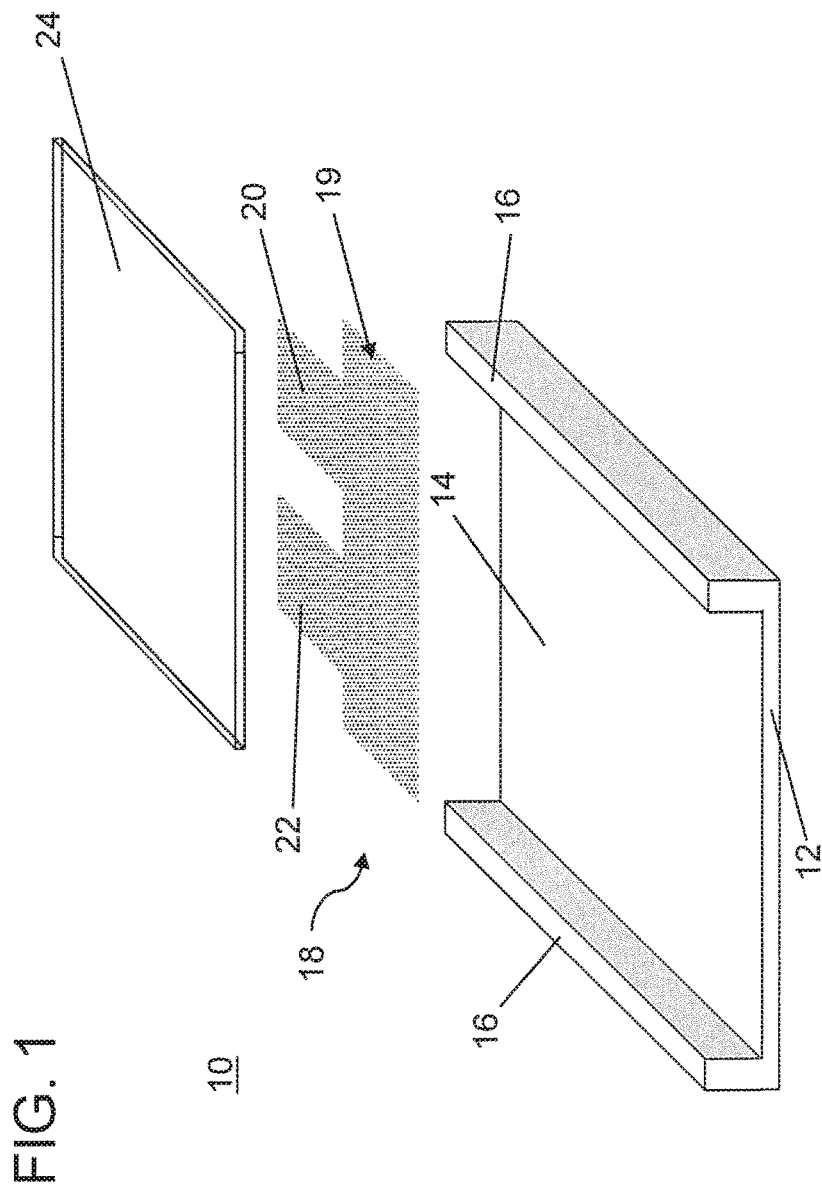
FIG. 1 is an exploded view showing assembly of a microfluidics device in accordance with an embodiment of the present invention.

Embodiments of the present invention provide alternatives for building microfluidics devices, including a hybrid approach using paper-plastic-glass microfluidics devices that combine excellent natural capillary capabilities of paper with greater liquid volume obtained with plastic channels and/or a "droplet pump" effect. These microfluidic devices make paper-based colorimetric/fluorescence analysis compatible with broader solvent liquids, e.g., alcohols, such as, isopropanol or ethanol.

In useful embodiments, hybrid microfluidics fabrication methods combine a plastic substrate with paper. Using a wedge "sandwich" having a transparent cover, paper and substrate built using, e.g., additive/3D printer technology, injection mold plastic or etched glass, a hybrid channel-less microfluidics device can be fabricated. By adding a transparent cover made of, e.g., plastic/polymer and/or glass, in a wedge profile structure, wicking effects already present in the paper can be enhanced, and the microfluidic device construction can be simplified by becoming channel-less. Microfluidics devices composed of two or more pieces of different materials, such as, e.g., a substrate made of plastic/polymer or glass, combined with paper in a loading pad and/or microchannel will be referred to herein as a hybrid or hybrid-based microfluidics device. Paper can be employed to obtain good and consistent capillary effect and wettability to obtain results with, e.g., colorimetric tests or the like. By combining two or more different materials, a more versatile device can be applied to a larger number of solvents, e.g., alcohols, such as ethanol, isopropanol. The wedge structure can be configured to provide a droplet pump effect that avoids excess liquid from a sample from cross contaminating an analysis being executed on an adjacent finger, region or microchannel in the hybrid-based microfluidics device.

The hybrid-based microfluidics device can include a substrate that can be formed from plastic, e.g., 3D printed plastic. The substrate can form a hydrophobic barrier between microchannels or adjacent regions that supports a high volume of liquid (e.g., ~dozens of microliters).

Hybrid-based microfluidics devices in accordance with the invention can be employed in many applications. Application examples can include, but are not limited to human and veterinary healthcare, immunoassay analysis, disease/protein/marker detection (e.g., for infectious disease, cancer, heart attack detection, etc.), food safety, allergens, food-borne pathogens (e.g., *Escherichia coli*, *Salmonella* spp., and *Listeria monocytogenes*), agricultural uses, environmental uses, soil/water contamination analysis (e.g., pH, nitride concentration, ion concentration (potassium, phosphorous, magnesium, sodium, etc., heavy metal concentration)), etc.

Conventional paper heating steps, which are needed for wax reflow or polymer cure in conventional microfluidics devices can be eliminated. Sealing barriers are sometimes built by using wax printing reflow, by heating the wax using controlled temperature and time to form the barriers. The present embodiments eliminate the need for heating steps, which can completely avoid degradation of antibodies, proteins, reagents, etc. used for immunoassays, etc.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, an exploded view of components employed for a hybrid microfluidics device 10 in accordance with one embodiment is illustratively shown. The device 10 combines a plastic substrate 12 with paper 18. By adding a transparent plastic or glass cover 24 in a wedge profile structure, a wicking effect already present in the paper 18 is enhanced to obtain a droplet pump effect.

The hybrid microfluidics device is fabricated using a sandwich approach. The substrate 12 can include a plastic material, glass, or any other suitable materials. In one useful embodiment, the material selected for the substrate 12 includes polymer/resin employed in additive/3D printer technology. In other embodiments, the substrate 12 can include plastic formed by injection molding, stamping or other processes, glass etched or otherwise formed to a desired shape.

The substrate 12 can include features 16 formed therein or thereon. The features 16 can include walls, separators, isolators, sealing structures or other structures employed to contain, control or deviate a fluid within a base region 14 of the substrate 12. In other embodiments, the features 16 can include structures configured to form one or more separate channels to maintain separation between a fluid or fluids on the base region 14. It should be understood that the described structures between channels may not create a sealing barrier between substrate 12 and channel cover 24, by having a height less than the distance between substrate 12 and channel cover 24. The features 16 can be configured to provide supports for the channel cover 24 and to form and maintain a wedge profile for a droplet pump effect.

Paper 18 can be configured into any geometrical shape useful for a particular application. For example, paper 18 can include a covering loading pad 126 (FIG. 3), colorimetric analysis regions 120, 122 (FIG. 3) and can have a length that can extend through the entire microfluidics device length. Paper 18 can include any suitable paper material that is employed to absorb and wick a fluid. Paper 18 can include, e.g., cray-paper, paper towel, qualitative paper, nitrocellulose paper, chromatography paper or any other suitable material and combination of materials. Paper 18 also includes a composition of the same type of paper, but with different porosities, grammage, etc. Paper 18 can be stamped or cut to achieve its shape. Paper 18 can be shaped to provide test regions 20, 22 or other features designed to form separate regions and substitute for channels in conventional devices.

A transparent cover 24 includes a flexible or rigid sheet, which can include glass or a transparent/translucent plastic/polymer. In one embodiment, the transparent cover 24 can engage portions of the features 16 to provide a wedge angle with the base region 14. In another embodiment, the transparent cover 24 can form a wedge angle using the paper 18 to support one end portion of the cover 24 and an opposite end portion of the cover 24 can be supported by the base region 14. In this embodiment, the paper 18 extends only a portion of the entire length of the substrate 12 to create a height difference and therefore a wedge shape between the substrate 12 and the cover 24.

The features 16 can be configured to interface with the cover 24 including inclined surfaces (not shown) within walls of the features 16 to secure the cover 24 and form the wedge angle relative to the base region 14.

Figure 2:
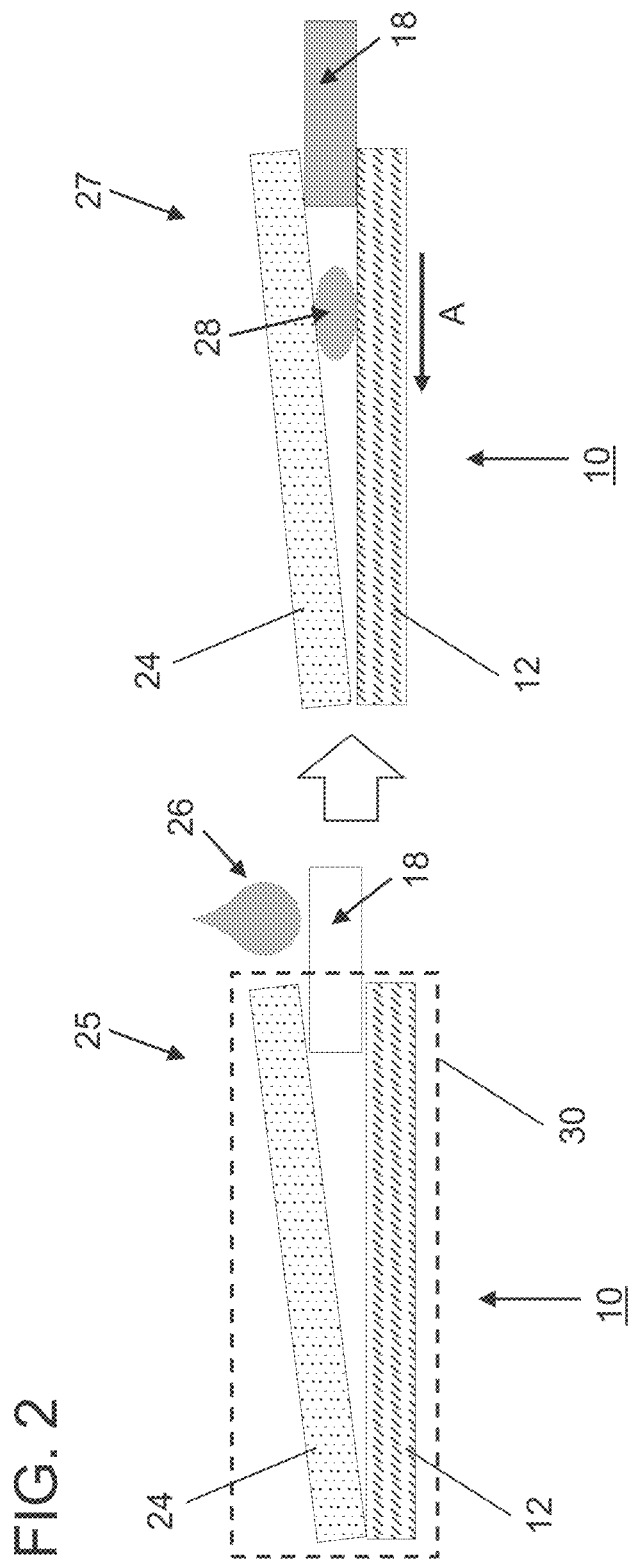
FIG. 2 is a cross-sectional view showing two instances of the microfluidics device of FIG. 1, with a first instance including a sample added to a paper and a second instance having excess fluid wicking along the wedge profile in accordance with an embodiment of the present invention.

Referring to FIG. 2, a cross-sectional view of the hybrid microfluidics device 10 is shown. In a first instance 25, the device 10 includes a wedge profile 30 that is provided by the presence of paper 18 between the substrate 12 and the transparent cover 24. It should be understood that the wedge profile can be provided by other methods, such as, e.g., inclined surfaces or protrusions provided by vertical structures, etc. The paper 18 can include a loading pad 19 for the loading of a sample 26 into the hybrid microfluidics device 10. The loading pad 19 can extend beyond edges of the substrate 12 and/or the cover 24, although the loading pad 19 can be recessed into the hybrid microfluidics device 10. The sample 26 is placed on the loading pad 19 (e.g., paper) and absorbed.

In instance 27, a droplet 28, which can represent excess fluid or a test portion of the sample depending on the design, flows along the wedge profile in a flow direction "A". A small gap difference due to, for example, paper thickness of the loading pad 19 on one side creates a droplet pump effect, that avoids the excess of the liquid sample droplet 28 from cross-contaminating a different analysis being executed in, e.g., an adjacent channel or region of the device 10. The excess liquid forms the droplet 28 that moves in a direction that does not interfere with other lateral channels or regions and instead occupies a space where the substrate 12 and cover 24 are in direct contact to hold the droplet 28 in place. This permits multiple channels in a channel-less microfluidics device design. The channels can be defined only by the paper layout, which includes the loading pad 19 and colorimetric analysis regions 20, 22 (FIG. 1), providing a simpler way to build the microfluidics device.

Figure 3:
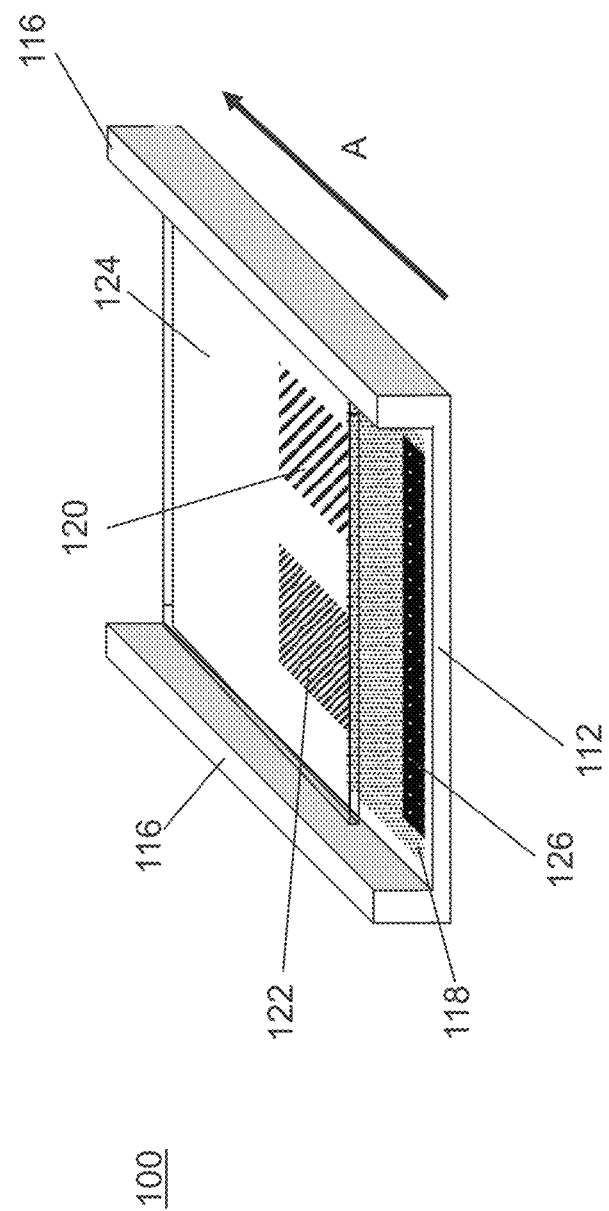
FIG. 3 is a perspective view showing assembly of another microfluidics device having a paper with a loading pad and two channel-less testing regions formed using the wedge profile for a droplet pump effect in accordance with another embodiment of the present invention.

Referring to FIG. 3, a channel-less hybrid microfluidics device 100 is illustratively shown in accordance with another embodiment. Device 100 includes a substrate 112, which can include materials employed in additive/3D printer technology, injection molded plastic, extrusion molded plastic, etched glass, etc. A transparent cover 124 can include glass, a transparent plastic/polymer or other transparent/translucent material(s). A paper 118 includes a plurality of regions, such as, e.g., a loading pad 126, one or more colorimetric analysis regions 120, 122, other regions and regions connecting the different regions. The paper 118 can include a structure to permit unidirectional wicking although multi-directional wicking may also be employed.

A droplet pump effect is obtained by a wedge profile created by the paper thickness on one side of the cover 124. Each colorimetric analysis region 120 and 122 can be considered a different channel but is considered channel-less as there are no physical barriers between them. Instead, the colorimetric analysis regions 120, 122 rely on the droplet pump effect to prevent cross-contamination between the colorimetric analysis regions 120, 122. While the colorimetric analysis regions 120 and 122 are depicted as sharing the loading pad 126 and paper 118, other embodiments may include separate loading pads and paper regions.

Figure 4:
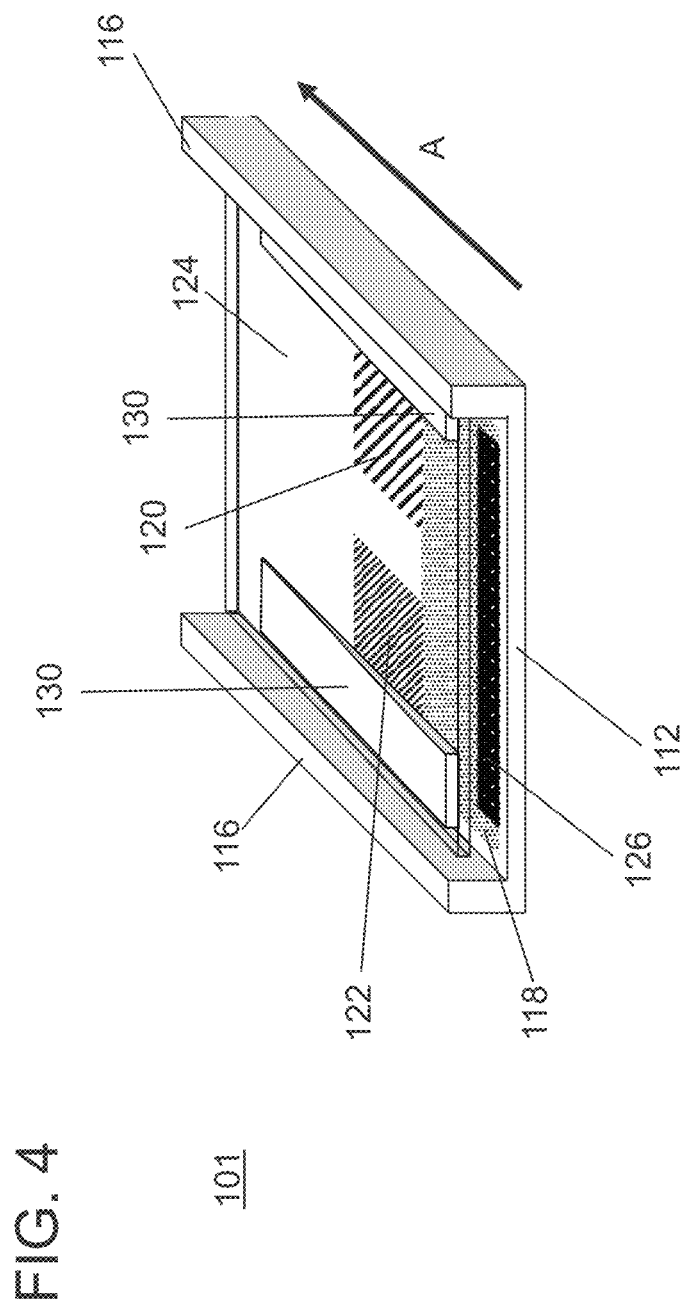
FIG. 4 is a perspective view showing assembly of another microfluidics device having a paper with a loading pad and two channel-less testing regions formed using the wedge profile for a droplet pump effect, the wedge profile being formed using wedge-shaped cover supports in accordance with another embodiment of the present invention.

Referring to FIG. 4, another channel-less hybrid microfluidics device 101 is illustratively shown in accordance with another embodiment. Device 101 includes the substrate 112, which can include materials employed in additive/3D printer technology, injection molded plastic, extrusion molded plastic, etched glass, etc. The transparent cover 124 can include glass, a transparent plastic/polymer or other transparent material(s). The paper 118 includes a plurality of regions, such as, e.g., a loading pad 126, one or more colorimetric analysis regions 120, 122, other regions and regions connecting the different regions.

This embodiment also includes a droplet pump effect obtained by a wedge profile created by cover supports 130 provided on or formed on the base region of the substrate 112. The cover supports 130 can include glass, plastic or any other suitable materials. The cover supports 130 can be part of substrate 112 or be fixed or adhered to features 116 of the substrate 112 or can be loosely placed on top of the paper 118. The cover supports 130 can be provided over the paper 118. The transparent cover 124 is placed over the cover supports 130 to form the wedge shape profile. While the present embodiment illustratively depicts two cover supports 130, it should be understood that a single cover support of multiple (greater than two) cover supports can be employed.

Colorimetric analysis regions 120 and 122 can each be considered a different channel to provide a channel-less device as there are no physical barriers between the regions 120, 122. Instead, the colorimetric analysis regions 120, 122 rely on the droplet pump effect to enhance the paper wicking effect and to prevent cross-contamination between the colorimetric analysis regions 120, 122. While the colorimetric analysis regions 120 and 122 are depicted as sharing the loading pad 126 and paper 118, other embodiments may include separate loading pads and paper regions.

Figure 5:
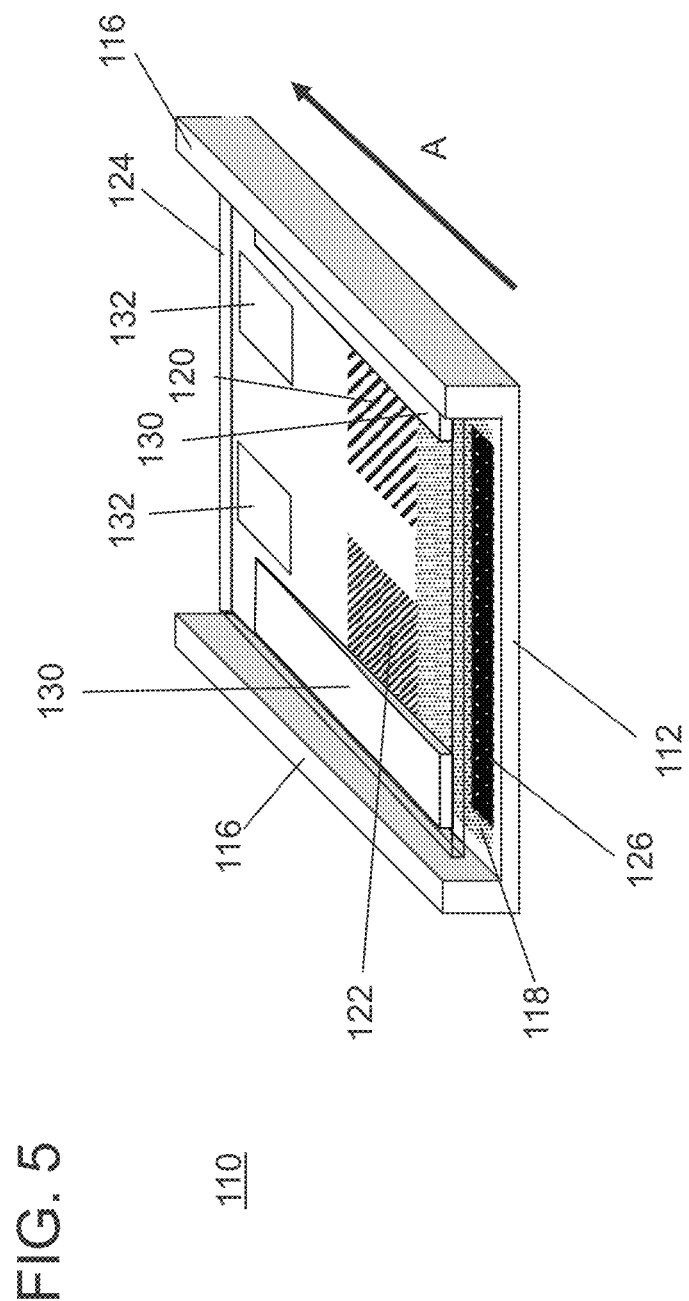
FIG. 5 is a perspective view showing assembly of another microfluidics device having a paper with a loading pad and two channel-less testing regions formed using the wedge profile for a droplet pump effect, the wedge profile being formed using wedge-shaped cover supports and reservoirs are formed in a base region of a substrate for receiving excess fluid in accordance with another embodiment of the present invention.

Referring to FIG. 5, another channel-less hybrid microfluidics device 110 is illustratively shown in accordance with another embodiment. Device 110 includes the substrate 112, which can include materials employed in additive/3D printer technology, injection molded plastic, extrusion molded plastic, etched glass, etc. The transparent cover 124 can include glass, a transparent plastic/polymer or other transparent material(s). The paper 118 includes a plurality of regions, such as, e.g., a loading pad 126, one or more colorimetric analysis regions 120, 122, other regions and regions connecting the different regions.

A droplet pump effect is obtained by a wedge profile created by cover supports 130 provided on or formed on the base region of the substrate 112. The cover supports 130 can include glass, plastic or any other suitable materials. The cover supports 130 can be part of substrate 112 or be fixed or adhered to features 116 of the substrate 112 or can be loosely placed on top of the paper 118. The cover supports 130 can be provided over the paper 118. The transparent cover 124 is placed over the cover supports 130 to form the wedge shape. While the present embodiment illustratively depicts two cover supports 130, it should be understood that a single cover support of multiple (greater than two) cover supports can be employed.

Colorimetric analysis regions 120 and 122 can be considered different channels but are actually channel-less as there are no physical barriers between them. Instead, the colorimetric analysis regions 120, 122 rely on the droplet pump effect to enhance the paper wicking effect and to prevent cross-contamination between the colorimetric analysis regions 120, 122. While the colorimetric analysis regions 120 and 122 are depicted as sharing the loading pad 126 and paper 118, other embodiments may include separate loading pads and paper regions.

In this embodiment, the substrate 112 includes reservoir regions 132 formed therein. The reservoir regions 132 can include recesses or cavities capable of receiving and storing excess fluid from droplets employed in microfluidics testing. By receiving a relatively large liquid volume, it could also work in some circumstances as an embedded micro cuvette, where an additional colorimetric/fluorescence analysis can be executed. It should be understood that the reservoirs 132 can be employed with any embodiment in accordance with the present invention.

The embodiments described herein increase the number of applications possible for a paper-based microfluidics device, for example, the types of solvents that can be employed can be expanded to include solvent liquids, such as, e.g., isopropanol, ethanol or other alcohols or high volatility liquids. Other advantages of the channel-less capabilities of the present invention include dispensing with the need for heating wax barriers for wax reflow or polymer cure, where such heating steps create issues for antibody, protein, or reagent degradation. Even the need for any wax printing step can be removed.

Figure 6:
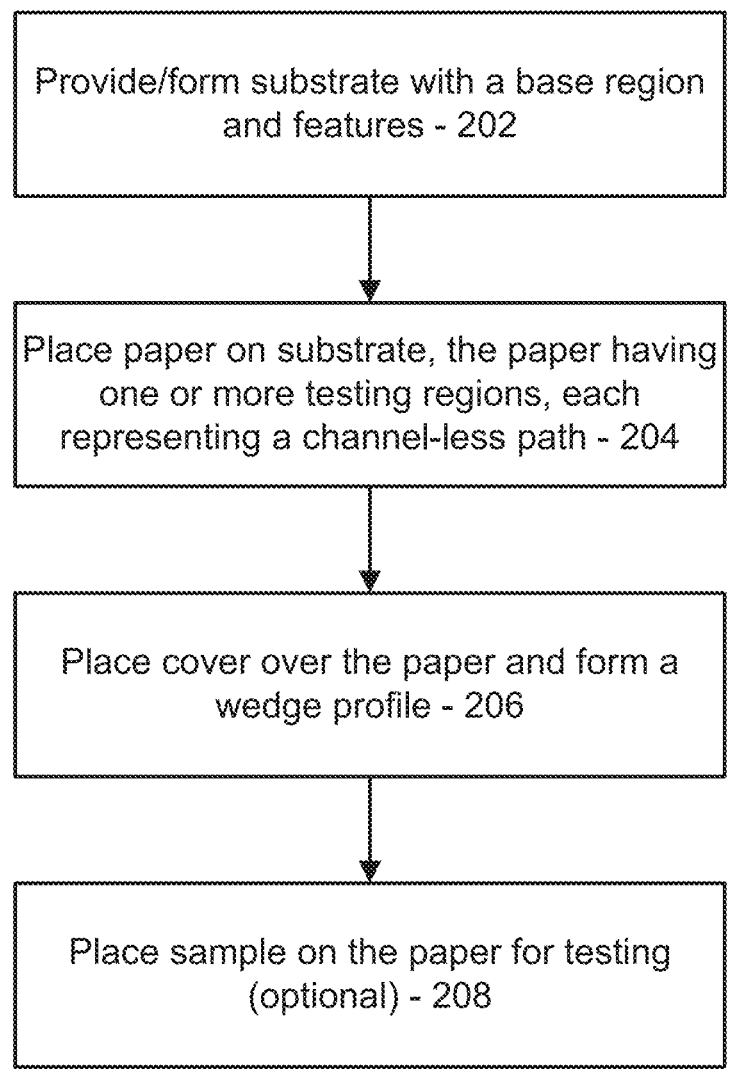
FIG. 6 is a block/flow diagram showing methods for forming and building microfluidics devices in accordance with embodiments of the present invention.

Referring to FIG. 6, methods for fabricating and using a hybrid microfluidics device are illustratively shown. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware.

In block 202, in one embodiment, the hybrid microfluidics device includes a substrate having a base region with a width and a length. The dimensions and structure of the substrate can be determined based upon the microfluidics application.

The substrate can be polymeric and formed using extrusion, injection or other molding processes. The substrate can also be formed from glass or other materials that can be etched to provide their features and structures, such as silicon, silicon nitride, silicon oxide, etc. The base region of the substrate can be open without barriers, walls or surfaces distinguishing portions or channels along the width of the base region. While barrier features can be absent, they can be present as well depending on the application. Another possible barrier employ surface treatments that provide different roughnesses and/or wettability characteristics, for additional degrees of control over the liquid present in the channel.

The substrate can include end walls or features that may or may not include inclined surfaces. In some embodiments, the inclined surfaces on the walls can be employed to provide a wedge profile as described. In one embodiment, the substrate includes reservoirs formed in the base region of the substrate to store excess fluid. In one embodiment, the reservoirs can function as micro cuvettes for assay analysis.

In block 204, a paper having a plurality of testing regions disposed along the width (or other direction) of the base region on the base region can be placed on the substrate. In one embodiment, the thickness of the paper provides the wedge profile. The paper can be interchangeable, and the device can be reusable or disposable. The paper can be inserted into the microfluidics device as a replacement for reuse.

The paper can be formed to have one or more testing regions. The testing regions can be connected to a same loading pad or there may be a plurality of loading pads depending on the design and assays to be conducted.

The testing regions can each define a separate test or separate test channel or path without barriers or actual channels. The test paths are considered channel-less, as barriers are not provided between the test paths. This greatly simplifies the design of the microfluidics device and permits multiple tests without cross-contamination.

In block 206, in one embodiment, a cover is supported higher on one end than the other to form the wedge profile. The cover can be supported by paper, cover supports, features in side walls formed in the substrate, etc. The cover height varies along the length direction of the substrate.

In block 208, once the microfluidics device is complete, a sample can be placed on the paper for testing. The sample is absorbed in the paper and excess fluid wicks along the wedge profile to draw off the excess. This wicking or drawing off of the excess fluid prevents cross-contamination between adjacent testing regions of the paper. The space between the testing regions remains dry and excess liquid does not laterally cross in the width direction of the substrate. Instead, the wicking moves the excess liquid in the length direction of the substrate preserving the integrity of the multiple tests. The tests can include colorimetric or fluorescence tests, although other types of tests are also contemplated.

Having described preferred embodiments for hybrid microfluidics devices (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A hybrid microfluidics device, comprising:
a substrate having a hydrophobic surface with a width and a length;
a paper having an upper surface, a lower surface, and a thickness therebetween, wherein a distal end of the paper is on the hydrophobic surface of the substrate and a proximal end of the paper extends beyond a first end of the substrate; and
a rigid cover having a first end in direct contact with the distal end of the paper, a second end in direct contact with the substrate, and a proximal edge of the first end of the cover that is separated by a distance from the paper, wherein the thickness of the paper creates an angle between the cover and the substrate producing a tapering gap distance and wedge profile between the first end of the cover and the distal end of the paper.

2. The device as recited in claim 1, wherein the substrate is selected from the group consisting of printable polymer, plastic, and glass, and the paper is configured to have a plurality of test regions laterally separated by a gap across a width of the paper, wherein the cover is in contact with the distal end of the plurality of separate test regions.

3. The device as recited in claim 1, wherein the substrate includes reservoirs adjacent to the end of the substrate in contact with the cover configured to receive an excess portion of a sample of the fluid received by a loading pad portion of the paper.

4. The device as recited in claim 1, wherein the substrate includes cover supports that determine the angle of the wedge profile.

5. The device as recited in claim 1, wherein the plurality of adjacent testing regions includes colorimetric or fluorescence analysis regions.

* * * * *